United States Patent

Silver et al.

[15] 3,646,390

[45] Feb. 29, 1972

[54] IMAGE STORAGE SYSTEM

[72] Inventors: Robert Steven Silver, Kendall Park; Eduard Luedicke, Neshanic, both of N.J.

[73] Assignee: RCA Corporation

[22] Filed: Nov. 4, 1969

[21] Appl. No.: 873,819

[52] U.S. Cl. ....................315/10, 315/11, 317/235

[51] Int. Cl. ....................H01j 31/26

[58] Field of Search ....................315/10, 11; 317/235

[56] References Cited

UNITED STATES PATENTS

| | | | |
|---|---|---|---|
| 3,419,746 | 12/1968 | Crowell | 315/10 |
| 3,293,484 | 12/1966 | Nakayama et al. | 315/10 |
| 3,440,476 | 4/1969 | Crowell et al. | 315/10 |
| 3,440,477 | 4/1969 | Crowell et al. | 315/11 |
| 3,403,284 | 9/1968 | Buck et al. | 315/10 |

FOREIGN PATENTS OR APPLICATIONS

| | | | |
|---|---|---|---|
| 994,066 | 6/1965 | Great Britain | 315/10 |

*Primary Examiner*—Rodney D. Bennett, Jr.
*Assistant Examiner*—N. Moskowitz
*Attorney*—William H. Meagher and Eugene M. Whitacre

[57] ABSTRACT

An image pickup device having a charge storage target is operated in a first mode whereby scene light discharges photodiodes included in the target structure and an electrical signal corresponding to the scene light impinging on the diodes is derived as a scanning electron beam recharges the diodes. Apparatus is provided for operating the device in a second mode whereby an optical scene image is stored in the insulator portions of the target between the photodiodes and which stored image may be read out subsequently in a nondestructive manner.

6 Claims, 7 Drawing Figures

Figure 1:
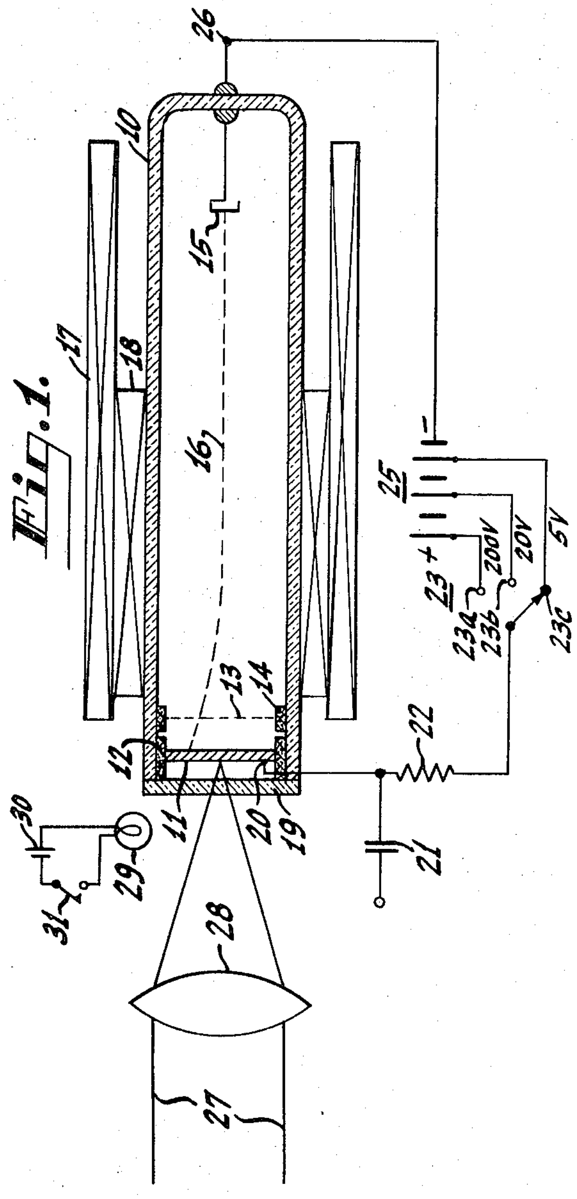
Figures 2A, 2B, 2C, 2D, 2E, 2F:
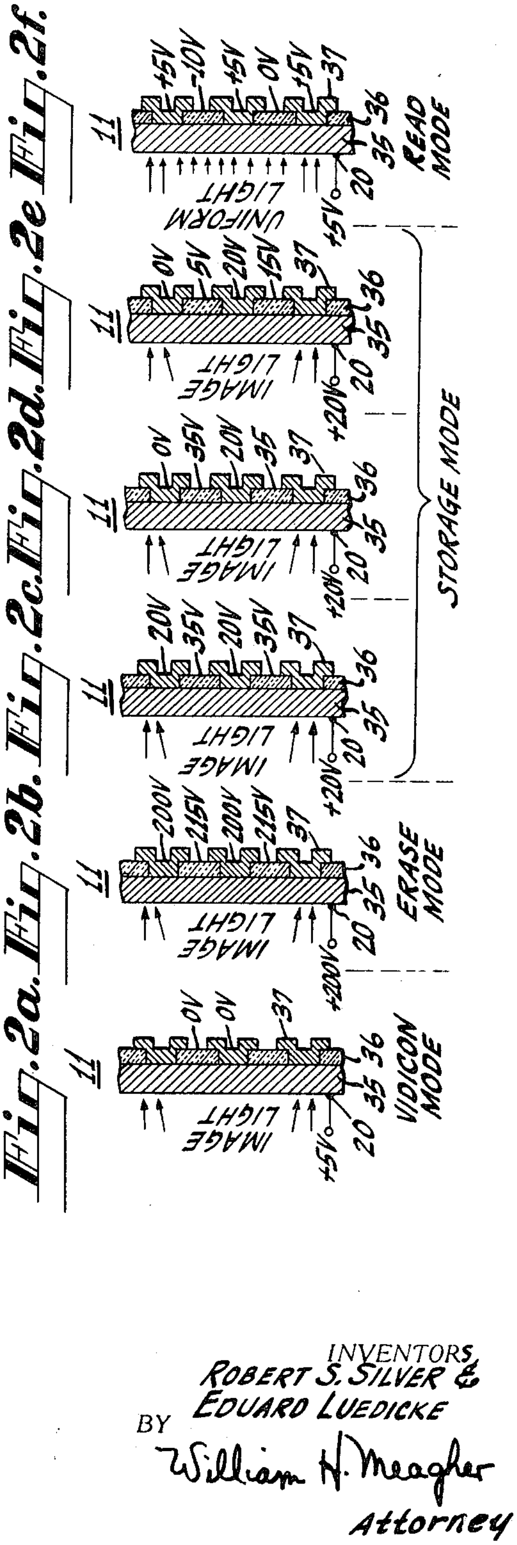

INVENTORS
ROBERT S. SILVER &
EDUARD LUEDICKE
BY William H. Meagher
Attorney

IMAGE STORAGE SYSTEM

BACKGROUND OF THE INVENTION

This invention relates to apparatus including a charge storage device which may be operated as an image pickup device and as an optical storage device.

There are many situations in which it is desirable to store an image utilizing a device such as a storage tube so that the stored image may be read out subsequently as a desired rate. The readout rate may be slower than conventional television field and line scanning rates because of bandwidth limitations of the medium through which the stored image is to be translated. The medium may be a narrow-band communication channel or a relatively narrow-band recording medium such as tape or film. Also, it may be desirable to store the image in a storage device in which the stored information may be read out in a nondestructive manner, i.e., in which the scanning electron beam does not erase the stored information on the first pass of the beam.

Furthermore, it is highly desirable to have a storage device which may also be utilized as an image pickup device such as a vidicon. Such a device may be operated for producing real-time video for immediate transmission or may be operated to store an image with subsequent readout at conventional or reduced beam scanning rates.

A device which may be used as a vidicon or a storage tube is known in the art. This device has the general structure of a vidicon but has the target electrode thereof modified by having separate dielectric portions formed on the beam side of the continuous photoconductive target element. By appropriately selecting the voltage applied to the target electrode, the device may be operated as a vidicon or as a storage tube to store an optical image in the dielectric (insulator) regions of the target electrode. The device requires the target electrode to be uniformly illuminated during an erase cycle prior to optical storage. It is necessary to block all light or to strongly illuminate the photoconductive target during the erase cycle because the continuous photoconductive layer is conductive in both directions and normal scene images permitted to reach the photoconductive target during the erase cycle deposit charges on the photoconductive target and thereby prevent the desired erasure. Uniform illumination may be provided by a shutter mechanism in front of the tube which eliminates all incident image or stray light or by a uniform source of illumination. The shutter apparatus must be operated in synchronism with the scanning intervals such as during the retrace portion of a vertical field. Apparatus for accomplishing this adds to the complexity of the storage apparatus and its associated controls and is relatively costly since the synchronizing apparatus must operate accurately.

An image pickup device having a target electrode comprising an area of photosensitive diodes is described in an article by Frank L. Skaggs entitled "Silicon Vidicon" appearing in *Proceedings Of National Electronics Conference*, (Dec. 1968, Vol. 24 pp. 339–342). This type of device operates as a vidicon image pickup tube utilizing charge storage by having light impinging upon a target electrode having a substrate of one conductivity-type layer stored as electrical charges in the junctions formed by regions of opposite conductivity semiconductor material diffused into the first material. The first-type material may be N-type silicon and the second P-type silicon. As an electron beam is scanned over the P-type regions of the target structure these regions are lowered to cathode potential. The N-type substrate is at a positive potential relative to the cathode potential, therefore, the P-N diode junctions are reverse biased.

As radiant energy impinges upon the target, the reverse bias is lowered by the photon-generated minority carriers in the N-type substrate diffusing to the junctions and the amount of scanning beam current required on the next electron beam pass to restore the reverse bias provides signal current proportional to the radiant energy impinging at that area of the target.

An object of the invention is to provide a storage system utilizing a charge storage device having a target electrode comprising a photosensitive diode array.

Another object is to provide a method of operating a charge storage device having a target electrode comprising a photosensitive diode array whereby a charge representative of an image incident on said target electrode is effectively stored in the insulator regions of the target adjacent the diodes.

A method is provided for storing an electrical charge representative of an optical image in insulator regions of a target electrode of a charge storage device, the target electrode comprising a layer of first semiconductor material of one conductivity type, regions of a second semiconductor material of a second conductivity type forming P-N junctions with the first material, and insulator regions disposed adjacent the regions of the second-type material. A first relatively high potential above the first crossover potential of the insulator is applied to the target electrode for effecting an erase cycle during which an electron beam scans the target. A second potential is then applied to the target electrode for effecting a storage cycle during which an electrical charge representative of radiant energy incident on the target electrode is effectively transferred from the diode junctions to insulator regions adjacent the respective junctions as the electron beam is scanned over the target.

A storage system is provided for storing a charge representative of an optical image in insulator regions of the target electrode of the charge storage device described above. Means are provided for selectively coupling a plurality of operating voltages to the target electrode for erasing the target and for effectively transferring and storing a charge representative of an incident image in the insulator regions of the target electrode.

A more detailed description of an embodiment of the invention is disclosed in the following specification and accompanying drawing of which:

FIG. 1 is a diagram of a storage system embodying the invention; and

FIGS. 2*a*–2*f* are diagrams illustrating the operation of the system shown in FIG. 1.

DESCRIPTION OF THE INVENTION

FIG. 1 is a diagram of an image storage system embodying the information. A charge storage device includes an evacuated glass envelope 10 containing a target electrode 11. Target electrode 11 is supported within envelope 10 by a mounting ring 12. A collector electrode 13 is mounted on a supporting ring 14 within envelope 10. A glass faceplate 19 seals the envelope 10 at the front of the charge storage device. Mounted within envelope 10 at the opposite end from target electrode 11 is an electron gun assembly including a cathode 15. Cathode 15 emits a beam of electrons 16 which is directed towards a target 11 when suitable operating voltages are coupled to the various electrodes. Electron beam deflecting components 18 are mounted externally of envelope 10 for causing electron beam 16 to scan a raster when the deflecting components 18 are energized by suitable current sources. Beam focusing means including a magnet 17 is mounted around deflecting components 18 for focusing the beam at target electrode 11. A lead is connected to an ohmic contact point 20 to target electrode 11 and coupled to the junction of a load resistor 22 and a video coupling capacitor 21. The other side of capacitor 21 may be coupled to a utilization device such as a video preamplifier. The other end of resistor 22 is coupled through a multiple position switch 23 to one of several operating potentials supplied by a battery 25. The negative terminal of battery 25 is coupled to a terminal 26 at which point contact is made to the cathode 15 within glass envelope 10. The tube structure described thus far is similar to the silicon vidicon described in the Skaggs article referred to above.

Means including a lens 28 focuses light rays 27 to form an image at target electrode 11.

A light source 29 is provided for uniformly illuminating target 11 when switch 31 is in its closed position and provide a current path for battery 30 to energize the light source.

FIGS. *2a–2f* are diagrams illustrating the operation of the image storage system shown in FIG. 1.

Referring to FIG. *2a*, the target electrode operating voltages associated with normal operation of the silicon vidicon as a vidicon image pickup device are shown. Target electrode 11 comprises a layer or substrate 35 of N-type silicon. A layer of silicon dioxide is deposited over the substrate 35 and is etched by photoresist techniques, for example, to form a pattern of silicon dioxide regions extending over the area of substrate 35. The silicon dioxide insulator areas are designated by the numerals 36. P-type semiconductor material is diffused into the substrate where the silicon dioxide is not present. The junctions of the P-type and N-type materials form diodes each of which is separated from the others by the silicon dioxide insulator regions. This target structure is similar to that described in the Skaggs article. A source of potential in the order of 5 to 10 volts is coupled to contact 20 of substrate 35. In FIG. 1 this potential is coupled through contact 23*c* of switch 23. It should be noted that the substrate voltage is 5 volts positive with respect to the cathode potential. In operating electron beam 16 is scanned over the rear of the target containing the p regions 37 of the diodes and insulating regions 36. Regarding the negative terminal of battery 21 and also cathode 15 as being at ground or 0 potential, electron beam 16 charges target regions 36 and 37 to 0 volts. The +5 volts coupled to substrate 35 and the 0 volts at portions 37 reverse biases the individual diodes of the target. In the absence of light impinging on the substrate of the target electrode this reverse bias charge would decay very slowly due to leakage across the P-N junction. Light rays from an object are focused by lens 28 to form an image and impinge upon substrate 35. Hole-electron pairs are generated as light impinges upon the target substrate 35 and minority carriers, holes in the N-type material, diffuse to the junction formed with the *p*-regions 37. This flow of minority carriers reduces the reverse bias on the diodes, the reverse bias being more greatly reduced at those diodes which receive the more intense light. As the electron beam is again scanned over the rear of target electrode 11, it deposits a charge on the insulator 36 regions and *p*-regions 37, the most charge being deposited on the p regions 37 which have had their reverse bias lowered the most by the incident light. The charging current flows through load resistor 22 and switch contact 23*c* from battery 25 and is proportional to the amount of light incident on that area of target electrode 11. This sequence of incident light reducing the reverse bias at the diode junction and the electron beam recharging the diode junction to its full reverse bias potential is the normal operation of the silicon vidicon as a vidicon image pickup tube.

FIG. *2b* illustrates typical operating conditions of the target electrode 11 during the erase cycle prior to storage of an optical image. A target potential of +200 volts is coupled to contact 20 of substrate 35 through contact 23*a* of switch 23. The +200 volt potential is not critical but is selected such that it is well above the first crossover point for silicon dioxide. The crossover point is that point at which silicon dioxide emits secondary electrons when the electron beam is incident on the silicon dioxide. The +200 volt potential is capacitively coupled across the P-N junctions so that the P-type regions 37 are at approximately 200 volts. The +200 volt target potential is also capacitively coupled through the silicon dioxide insulator portions 36 such that the surface area of the dioxide regions 36 are also at 200 volts. The target is maintained at +200 volts for one frame interval during which the electron beam scans the p regions and the dioxide regions. The p-regions 37 remain at approximately +200 volts and the junctions are slightly forward biased. The beam electrons hitting the insulator regions 36 cause the insulator regions 36 to emit secondary electrons which are collected by collector electrode 13. Collector electrode 13 is at a high-positive potential of about +350 volts, for example. The loss of electrons due to secondary emission causes the exposed silicon dioxide surface to become positive with respect to the substrate potential. The exposed silicon dioxide regions are at about +215 volts after the scanning beam passes the dioxide regions. Thus, there is a nominal 15 volt difference of potential existing between insulator regions 36 and p regions 37. Note that it is not necessary to block the incident image light from the substrate during the erase operation as the slightly forward biased junctions prevent the junctions from being charged by the incident light.

FIGS. *2c*, *2d* and *2e* illustrate the operating conditions of the target electrode 11 during the storage cycle of operation. During the storage cycle, the target voltage is lowered to approximately +20 volts, which potential is supplied from battery 25 through contact 23*b* of switch 23. FIG. *2c* shows the insulator and *p*-region voltages immediately after the target voltage is lowered to 20 volts. The 180 volt drop in target potential from the previous 200 volts is capacitively coupled to the *p*-regions 37 and the insulator regions 36 drop 180 volts from their previous potential of +215 volts. Therefore, the *p*-regions 37 are at approximately +20 volt or target potential and the insulator regions 36 are at approximately +35 volt potential.

The image to be stored is incident on the substrate layer 35 of target 11 and, as described for the normal operation of the silicon vidicon, the incident light causes the reverse bias across the junctions to be reduced. As the electron beam scans the target it deposits electrons on the *p*-regions in proportion to the amount of light incident on that area of the target. As shown in FIG. *2d*, in those areas where the incident light is of greatest intensity the *p*-regions are at the lowest potential as the beam deposits a greater amount of electrons in those areas than on the areas where incident light is not as intense.

As shown in FIG. *2e*, the insulator regions adjacent the lower potential *p*-regions will be lowered in potential correspondingly because the beam deposits a greater number of electrons on the more positive insulator regions. The insulator regions will be charged negatively by the electron beam until the insulator potential is so low that the adjacent *p*-regions draw the majority of beam current. This operation is an effective transfer of charge from the P-N junctions to the insulator regions adjacent the respective p regions. In FIG. *2e*, it is shown that the insulator regions adjacent the lowered potential *p*-regions (those regions of the target which receive the most intense image light) are at lower potentials than the insulator regions 36 adjacent the higher potential *p*-regions 37. Thus, the charge representative of the optical image is stored in the insulator regions 36 of target 11. By interrupting the electron beam or by removing the target potential, this image representative charge may be stored in the insulator regions for extended periods of time.

FIG. *2f* illustrates the operating conditions of the target electrode during the read mode when it is desired to extract the information stores in the insulator regions of the target electrode. During the read mode, the target electrode is illuminated with uniform light as provided by light source 29 in FIG. 1 when switch 31 is closed. A target potential of about +5 volts is applied to contact 20 of substrate 35 through contact 23*c* of switch 23. The +5 volt potential is 15 volts lower than the previously applied target potential of +20 volts. This 15 volt drop is capacitively coupled to the junction of the diodes and the exposed surface areas of the insulator regions 36. Thus the relative charge distribution of the target will be as shown in FIG. *2f*. As the electron beam scans the target electrode, the most current will be conducted through the junctions adjacent the most positive insulator regions. The more negatively charged insulator regions repel the beam electrons and hence less current will be conducted through its P-N junctions adjacent the more negatively charged insulator regions. Therefore, the current drawn through load resistor 22 as the electron beam scans the target is representative of the stored image at any particular region of the target. The maximum beam lands in those areas of the target at which the insulator is at 0 volts, representing intense portions of image light and generating a maximum or white video signal. Minimum or no beam electrons land in those areas of the target at which the insulator regions are at minus 10 volts, representing areas of minimum image light and thereby producing a minimum or black level video signal. The scanning beam does not erase the charge on the insulator regions in a single pass. The beam may scan each area many times before the charge on the insulator is dissipated due to leakage, thereby providing a nondestructive readout capability which enables the stored image to be extracted continuously.

What has been described is a method and apparatus for utilizing a charge storage device such as the silicon vidicon for effectively storing an image in the insulator regions of the target structure. In the described embodiment a simple switch and battery arrangement was utilized to disclose the operation of the storage system. However, it is to be understood that any suitable switch apparatus may be utilized to control the operating voltages for operating the device at a rate corresponding to the desired scanning intervals. The described apparatus eliminates the need of shutter apparatus for blocking incident light during the operating cycle and therefore provides a less costly and less complicated storage system than prior arrangements.

What is claimed is:

1. An image storage system comprising:

a charge storage device including an electron gun and a target electrode, said target electrode comprising a layer of first conductivity-type semiconductor material, regions of semiconductor material of a second conductivity type diffused into one surface of said layer and forming P-N junctions therewith and insulator material regions formed between said second type semiconductor regions;

a source of operating potentials for said target electrode; and means for selectively coupling to said target electrode a first of said potentials for enabling storing a charge representative of an image incident on said target electrode in said junctions, a second of said potentials for effectively transferring said charge from said junctions to said insulator regions adjacent said junctions, and a third of said potentials for retaining said charge in said insulator regions as a beam from said electron gun is scanned over said target electrode for deriving a signal from said target electrode representative of said stored image, said third potential being selected for enabling said target to be scanned a plurality of times without removing said charges from said insulator regions.

2. An image storage system according to claim 1 wherein:

said first potential is greater than the crossover potential of said insulator material for enabling erasing any light-representative charges from said target and for establishing a potential difference between said insulating regions and said regions of a second conductivity type.

3. An image storage system according to claim 2 wherein;

said second potential is less positive than said first potential for effecting an image representative charge to be deposited across said junctions and for causing said charge to be transferred effectively to said insulator regions.

4. An image storage system according to claim 3 wherein:

said third potential is less positive than said second potential; and wherein means are provided for uniformly illuminating said target electrode for causing said junctions to remain at substantially said third voltage level and for causing said image representative charge to be stored only in said insulator regions.

5. The method of storing an electrical charge representative of an image in a charge storage device including an electron gun and a target electrode, said target electrode comprising a layer of semiconductor material of a first conductivity type, first regions of semiconductor material of a second conductivity type forming P-N junctions with said layer and second regions of insulating material deposited between said first regions, comprising:

applying a first potential to said first electrode for causing said second insulator regions to emit secondary electrons whereby said second regions are brought to a more positive potential than said first regions as an electron beam from said gun scans said target;

applying a second potential lower than said first potential to said target electrode as said beam scans said target whereby an image incident on said target layer causes said junctions and insulator regions associated therewith and on which a greater intensity image light is incident to be charged to a lower potential by said beam than said junctions and associated insulator regions on which a lesser amount of image light is incident; and applying a third potential lower than said second potential to said target electrode and uniformly illuminating said target layer whereby said first regions are maintained at said third potential and said second regions are lowered in potential an amount substantially equal to the difference between said second and third potentials and said beam deposits a charge on said second regions whereby current conducted across said junctions corresponds to the intensity of the stored image at each of said second insulator regions.

6. An image storage system, comprising:

a charge storage device including an electron gun structure and a target structure contained within an evacuated glass envelope, said target electrode comprising a substrate of a first conductivity-type semiconductor material first regions of a second conductivity-type semiconductor material disposed over said substrate and forming P-N junctions therewith and second regions of insulator materials disposed over said substrate between said first regions;

means for forming an image at said target electrode;

a plurality of voltage sources;

means coupling a first of said voltages to said target electrode, the magnitude of said first voltage being such as to cause said second insulator regions to emit secondary electrons when scanned by an electron beam whereby said insulator regions are charged to a more positive potential than said first regions during a first scanning interval;

means coupling a second of said voltages to said target electrode, the magnitude of said second voltage being less than said first voltage and such as to cause an electrical charge representative of said image incident at said target electrode to be stored in said P-N junctions and in said insulator regions during a second scanning interval subsequent to said first scanning interval;

a light source for illuminating said target electrode;

means coupling a third of said voltages to said target electrode and for simultaneously energizing said light source, the magnitude of said third voltage being less than said second voltage such as to cause, in the presence of said light, said substrate and said first regions to be maintained at substantially said third potential and said charge to be restrained by said second insulator regions whereby an electrical signal representative of said stored image is derived from said target electrode during a third scanning interval subsequent to said second scanning interval.

* * * * *

UNITED STATES PATENT OFFICE
CERTIFICATE OF CORRECTION

Patent No. 3,646,390 Dated February 29, 1972

Inventor(s) Robert Steven Silver et al.

It is certified that error appears in the above-identified patent and that said Letters Patent are hereby corrected as shown below:

In the grant (only), cancel the illustrative figure on the cover sheet and substitute the following:

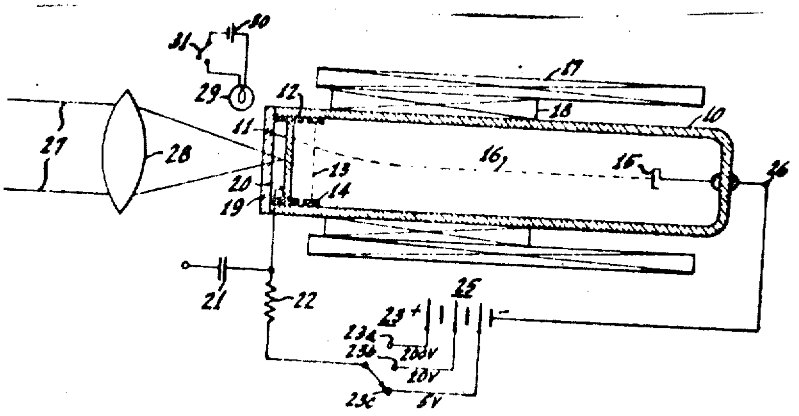

Signed and sealed this 26th day of December 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334.